United States Patent [19]

Laves

[11] Patent Number: 5,486,405
[45] Date of Patent: Jan. 23, 1996

[54] METHOD OF PRODUCING A CORRUGATED BOARD AS WELL AS A CORRUGATED BOARD

[75] Inventor: Wolf-Henning Laves, Groenenbach, Germany

[73] Assignee: Hans Kolb Wellpappe GmbH & Co., Germany

[21] Appl. No.: 131,145

[22] Filed: Oct. 4, 1993

[30] Foreign Application Priority Data

Oct. 14, 1992 [DE] Germany ............... 42 34 689.4
Feb. 3, 1993 [EP] European Pat. Off. ............ 93101662

[51] Int. Cl.$^6$ ............... B32B 3/28; B32B 31/00
[52] U.S. Cl. ............... 428/182; 428/143; 428/148; 428/167; 428/172; 428/201; 428/204; 428/206; 428/209; 428/211; 428/208; 428/184; 156/277; 156/290; 264/105; 264/286
[58] Field of Search ............... 428/182, 184, 428/120, 143, 148, 167, 172, 201, 204, 206, 208, 209, 211, 212, 535, 537.5, 913, 922; 156/277, 290, 205, 260; 206/328, 334; 361/212, 220; 264/105, 167, 286, 505; 427/450, 577, 208.6

[56] References Cited

U.S. PATENT DOCUMENTS

| | | | |
|---|---|---|---|
| 4,289,513 | 9/1981 | Brownhill et al. | 428/182 |
| 4,528,222 | 7/1985 | Rzepecki et al. | 428/201 |
| 4,684,020 | 8/1987 | Ohlbach | 206/328 |
| 4,685,563 | 8/1987 | Cohen et al. | 206/328 |
| 4,746,574 | 5/1988 | Hattori et al. | 428/409 |

FOREIGN PATENT DOCUMENTS

| | | |
|---|---|---|
| 0216311 | 4/1987 | European Pat. Off. . |
| 0228710 | 7/1987 | European Pat. Off. . |
| 2947262 | 10/1980 | Germany . |
| 3214940 | 12/1982 | Germany . |
| 2023495 | 1/1980 | United Kingdom . |

*Primary Examiner*—Donald J. Loney
*Attorney, Agent, or Firm*—Laff, Whitesel, Conte & Saret, Ltd.

[57] ABSTRACT

In the case of a method of producing a corrugated board for protecting electrostatically endangered articles 10 against electrostatic: discharges and electric fields, at least one corrugated layer 1 and at least one flat layer 2, 3 are glued together, a shield means 4, which contains carbon and/or graphite, being applied, prior to the glueing of said layers 2, 3, to the surface 40, 50, 60 of at least one layer which will be located in the interior of the corrugated board structure. This shield means 4 is applied as a layer, which comprises interconnected layer components 80 and intermediate interspaces 90 occupying a certain area, before the layers 1, 2, 3 are glued together in the area of said interspaces 90. The interspaces 90 are either completely free or covered by thinner layer components 90' occupying a certain area and constituting part of the shield means 4. In the corrugated board W, which is produced in accordance with this method, the layers 1, 2, 3 including the shield means 4 between them are glued together preferably in the area of the interspaces 90, if necessary through the thinner layer components 90'.

31 Claims, 2 Drawing Sheets

METHOD OF PRODUCING A CORRUGATED BOARD AS WELL AS A CORRUGATED BOARD

FIELD OF THE INVENTION

The present invention refers to a method according to the generic clause of patent claim 1 as well as to a corrugated board according to the generic clause of claim 9.

BACKGROUND OF INVENTION

In the structure of a corrugated board known from U.S. Pat. No. 4,685,563, a full-area continuous shielding layer of uniform thickness is provided in the interior of the structure. The outer surfaces of the corrugated board are untreated and free, respectively.

In the structure of a corrugated board known from U.S. Pat. No. 4,482,048, at least one shielding, full-area layer is provided, again in the interior of the structure. The outer surfaces of the corrugated board are untreated.

In the case of a folding case consisting of corrugated board, which is known from DE-B1-2 947 262, at least the free side of the cover layer facing the interior has been printed on with an aqueous emulsion having carbon particles dispersed therein.

DE-A-3 214 940 discloses a sheeting material which has been printed on with a network or latticework of intersecting lines of conductive printing colour on one side thereof or on both sides thereof. When kraft paper is used as a sheeting material for the outer cover layer of a corrugated board, the network is only printed on the outer surface thereof; the sheeting material is transparent; in the case of corrugated board, openings are provided which permit looking through.

A full-area, uniform application of the shield means does not only necessitate a comparatively large amount and an unnecessarily large amount of shielding material, but, due to the shield means integrated in the interior of the corrugated board structure, major problems may arise when the layers are glued together as well as with respect to the durability of the glued connection. A corrugated board which has been treated in this way is difficult to dispose of. A network printed as a shield means onto the outer surface of a sheeting material is susceptible to damage and permits in its interspaces the transmission of charges or discharges to corners, edges or tips located in these interspaces and belonging to the components to be protected.

SUMMARY OF INVENTION

The present invention is based on the task of providing a method of the type mentioned at the beginning as well as a corrugated board in the case of which a reduced amount of shielding material will suffice to produce the desired shielding effect, and which are of such a nature that they permit disposal without any ecological hazards, and by means of which it is still possible to achieve a high standard of quality and security.

In accordance with the present invention, the posed task is solved by the method features disclosed in the characterizing clause of patent claim 1 as well as by the structural features according to the characterizing clause of claim 9.

In the case of the method according to the present invention, the interior surface of at least one layer in the corrugated board structure is provided with the shielding material predominantly only in the area of the layer components. The amount of shielding material used is thus reduced (up to 40%); the corrugated board can be disposed of and recycled in an ecologically beneficial manner. Due to the fact that no anti-adhesive shielding material, or a substantially reduced amount of anti-adhesive shielding material is present in the interspaces, said interspaces can be used for glueing the layers together. Surprisingly enough, it turns out that sufficient shielding is achieved in spite of the interspaces (Faraday's cage). In spite of the interior shield means, a durable and firm adherence between the layers is guaranteed. Due to the fact that the articles to be protected (electronic components, explosive or higly inflammable substances, e.g. chemical substances) are separated from the shield means by the semi-insulator defined by the layer(s), and are also locally separated from said shield means, the risk of damage which may be caused to said shield means as well as the risk of spark-over are eliminated. The corrugated board produced in this way does not differ from conventional corrugated board as far as its outward appearance is concerned, and it can be dyed or provided with an imprint in an arbitrary manner, or it can be improved in some other way.

Notwithstanding the fact that a reduced amount of shielding material is used, the corrugated board according to claim 9 guarantees a good shielding effect, it can be produced at a reasonable price and it is adapted to be disposed of or recycled in an ecologically beneficial manner. In the interspaces, a firm and durable glued connection between the individual layers is effected, similar to the glued connection existing in the case of conventional corrugated boards.

In the case of a special embodiment of the present method, the interconnected layer components are applied such that the interspaces are free towards the surface. The Faraday's cage consisting of the layer components produces the necessary shielding effect. The free interspaces can be used excellently for glueing the layers together.

In the case of an alternative, preferred embodiment, the interspaces are covered by thinner layer components occupying a certain area. The thinner layer components, which occupy a certain area, supplement the shielding effect produced by the thicker, interconnected layer components. In spite of this fact, it is still possible to provide a firm and durable glued connection because the adhesive will penetrate through said thinner layer components. Due to the use of these thinner layer components, the total amount of coating material used will be smaller than in the case of a full-area application of material of uniform thickness. This is advantageous with respect to disposal and recycling.

It will be particularly expedient, when the interconnected layer components are printed on and compacted. In the course of a plurality of printing processes, e.g. four to six printing processes, a firm and solid pattern of interconnected layer components will thus be formed. Thanks to the compacting, the total thickness of the corrugated board will not be increased.

A particularly expedient way of applying the thinner layer components is an application by means of full-area printing, spraying on, or spread-coating, said application being carried out prior to and/or subsequent to the application of the interconnected layer components. With respect to the small amount of coating material used, one printing process will be sufficient, for reasons of safety two printing processes may be performed as well. Subsequently, the shield means will consist of an interconnected layer with raised and receding layer components. In cases in which compacting has been effected, the interconnected layer components have, thanks to said compacting, approximately the same height as the thinner layer components. Notwithstanding this, the adhesive will still be able to penetrate the thinner layer components so as to establish the glued connection.

In the case of an alternative embodiment, the shield means is prefabricated as a web of material, a lattice, or a net, and is then additionally incorporated when the layers are glued together. This is advantageous from the point of view of process engineering, since the web, the lattice, or the net can be prefabricated on a different site, and, subsequently, it only has to be inserted into the corrugated board machine.

This web of material can, in an expedient manner, also comprise interconnected solid layer components and intermediate thinner layer components filling the interspaces, the glueing being predominantly effected through said thinner layer components.

In the case of an additional, important variation of the present method, an exterior surface of at least one layer has applied thereto a full-area, conducting coating, said coating being provided in addition to at least one interior shield means. The conducting coating takes care that electrostatic charges will be discharged, whereby the shielding effect of the shield means will be supported and improved. Between said conducting coating and the shield means, paper or paperboard material is effective as a semi-insulator, and this will improve the protective effect of the corrugated board.

In the case of an embodiment of the corrugated board in which the interspaces between the interconnected layer components are covered with thinner layer components occupying a certain area, the layers including the shield means between them are durably and firmly glued together in the area of said thinner layer components. The thinner layer components enhance the shielding effect of the Faraday's cage defined by the interconnected layer components.

It will be expedient to adjust the thickness and/or the density of said thinner layer components such that the adhesive by means of which the individual layers are glued together will penetrate through said thinner layer components and reliably produce its adhesive effect.

Lines, paths, rods, strips or individual areas as interconnected layer components define an effective Faraday's cage in the corrugated board, most expediently in the form of an approximately regular pattern so as to guarantee a uniform shielding effect. In this connection, it turned out to be expedient, when the total area occupied by the interspaces exceeds the total area occupied by the interconnected layer components. This will considerably reduce the amount of material required for the shield means.

When the interspaces define an approximately regular pattern whose orientation is perpendicular to, or oblique to the direction of wave crests of the corrugated layer, the maximum number of uniformly distributed glued points between the individual layers will be obtained.

The shield means can also be incorporated in and bonded to the corrugated board in the form of a prefabricated web of material comprising the interconnected layer components and the free interspaces or the thinner layer components filling said interspaces, and this will not impair the adherence between the layers connected by glueing. For this purpose, it will be expedient to incorporate a carrier web to which the shield means has previously been applied.

An excellent shielding effect, which provides efficient protection against damage to the shield means and which reliably causes a rapid discharge of electrostatic charges, will be achieved, when, in addition to at least one interior shield means, a full-area coating of conducting material is provided on the outer surface of the corrugated board structure.

Furthermore, it will be particularly expedient to provide a sublimable corrosion inhibitor on, in, or below the conducting coating, said corrosion inhibitor being either applied previously or admixed to the conducting material. The corrosion inhibitor will evaporate throughout a long period of time and will thus provide and additional protection against corrosion for the metallic surfaces of the components to be protected. The corrosion inhibitor uses the corrugated board structure as a depot from which it will evaporate slowly. It will be expedient, when said corrosion inhibitor contains polar, organic salts; vapours, which are set free from said salts, will condense on metal surfaces and form mono-molecular films, which will inhibit the electrochemical processes resulting in corrosion.

The surface resistance of the shield means in the corrugated board structure should expediently be less than $10^4$ ohm/ square, preferably less than $10^1$ ohm/square. The surface resistance of the outer surface of the corrugated board structure provided with the conducting material lies between $10^5$ and $10^{12}$ ohm/square. According to the standard CECC 00 0015/I, 1991, the shield means is, consequently, electrostatically shielding, whereas the conducting coating is electrostatically conducting.

Embodiments of the subject matter of the invention are explained on the basis of the drawings. In the drawings, the shield means and the conducting coating are shown exaggeratedly thick. In actual fact, however, they are thinner and they must be imagined to have partly penetrated into the layers of the corrugated board structure.

DETAILED DESCRIPTION OF THE INVENTION

Figure 1:
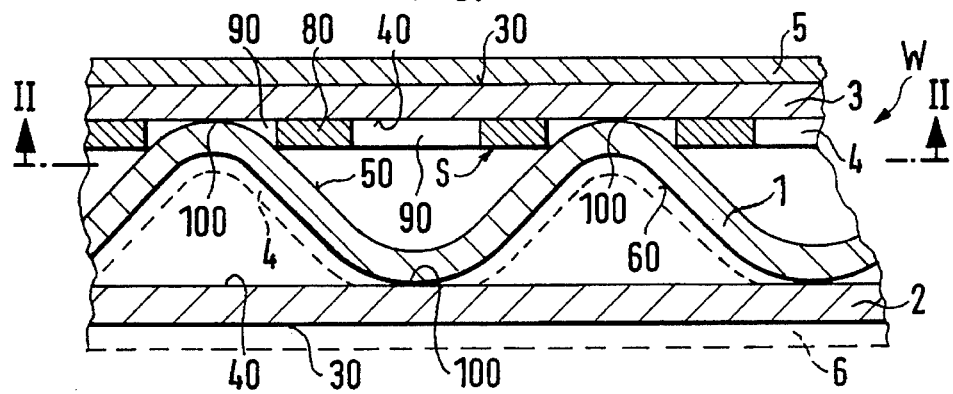
FIG. 1 shows a cross-section through a corrugated board, alternative or additive detail variations being shown side by side.
Figure 2:
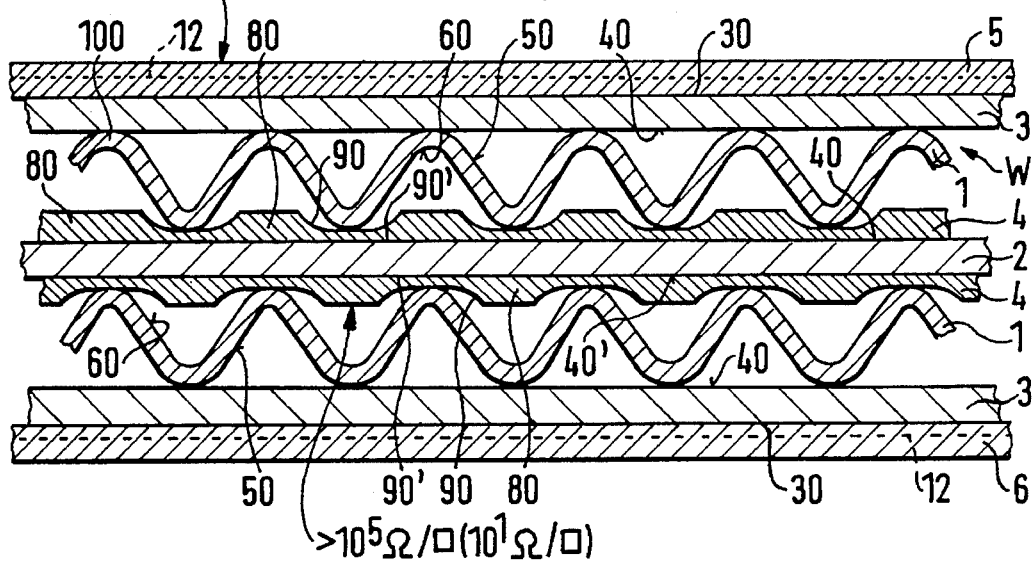
FIG. 2 shows a cross-section through an additional embodiment of a corrugated board.
Figure 3:
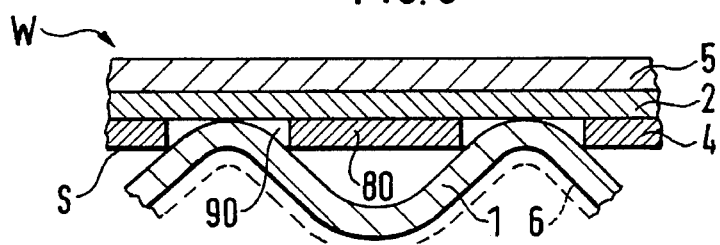
FIG. 3 shows a cross-section through an additional embodiment of a corrugated board.
Figure 6:
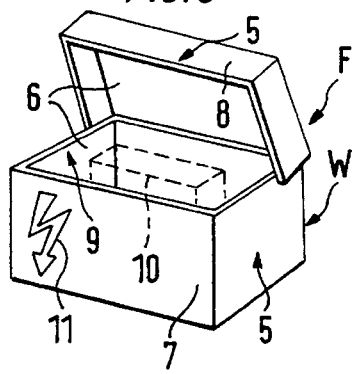
FIG. 6 shows a perspective view of a folding case consisting of a corrugated board.
Figure 7:
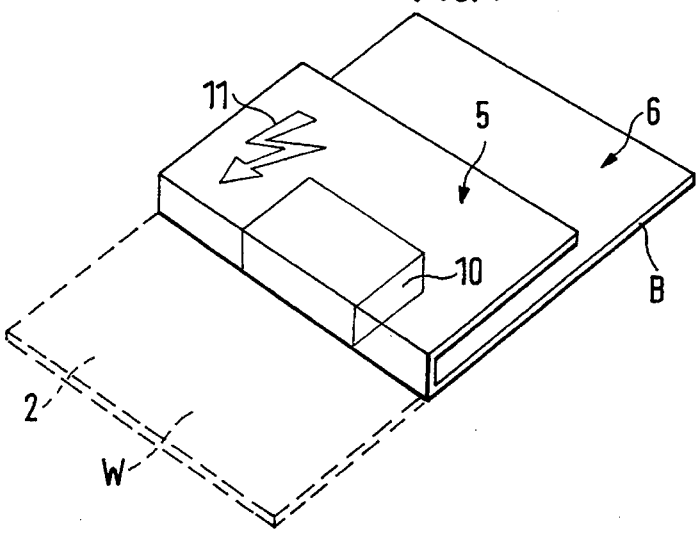
FIG. 7 shows a perspective view of a sheet material consisting of a corrugated board.

A corrugated board W according to FIG. 1, 2 and 3 is intended to be used e.g. for producing cases, preferably folding cases F of the type shown e.g. in FIG. 6, or as sheet material B according to FIG. 7 used for packing articles, such as electronic components 10; these articles 10 are to be protected against electric and/or electromagnetic and/or electrostatic dangers and possibly against corrosion.

According to FIG. 1, the corrugated board W consists of a corrugated layer 1 which is glued to flat layers 2, 3 in the area of its wave crests 100. Optionally, each of the layers 1, 2, 3 consists of several interconnected individual layers of paper material or paperboard material. The simplest form is an "open corrugated board" according to FIG. 3 comprising only one flat layer 2 and one corrugated layer 1. FIG. 1 represents the socalled standard corrugated board. The corrugated board W according to FIG. 2 comprises two corrugated layers 1 with an intermediate flat layer 2 and two flat layers 3 on the outer surfaces of the corrugated board structure.

In FIG. 1, the surfaces of the layers 3, 2 which are positioned in the interior of the corrugated board structure are provided with reference numeral 40, whereas the exterior surfaces are provided with reference numeral 30. The surfaces of the corrugated layer 1 provided with references numerals 50 and 60 are located in the interior of the corrugated board structure in FIG. 1. In FIG. 3, the surface 60 of the corrugated layer 1 is an exterior surface.

In FIG. 1, a shield means 4, which contains carbon and/or graphite, is inserted between the layers 3, 1. The shield means 4 consists of interconnected layer components 80 between which interspaces 90 occupying a certain area are provided. The shield means 4 is applied to the surface 40 of the layer 3. The interspaces 90 extend continuously up to the surface 40. In the area of said interspaces 90, the corrugated layer 1 is glued to the flat layer 3.

The shield means 4 may just as well be applied to surface 50 or—as indicated by the broken line—to surface 60 of the corrugated layer 1. It is also imaginable to provide the shield means 4 on surface 40 of the other layer 2. Furthermore, it is imaginable to provide a plurality of shield means 4 in the corrugated board structure according to FIG. 1.

The exterior surfaces 30 of layers 2, 3 in the corrugated board W according to FIG. 1 can be untreated. It will, however, be expedient to apply to at least one of said surfaces 30 a continuous coating 5 consisting of a conducting material, e.g. a conducting lacquer. For the sake of simplicity, such a conducting coating 6, e.g. in the form of an applied, conducting lacquer, (indicated by a broken line), may also be provided on the other surface 30 of the layer 2.

The shield means 4 is applied in several printing processes for forming thus the interconnected layer components 80 and for compacting said layer components. It will be expedient to carry out up to six printing processes with a printing colour or aqueous emulsion containing carbon and/or graphite, the area weight being 5 $g/m^2$ (wet) corresponding to an area weight of 2.5 $g/m^2$ (dry) (these are, however, only rough recommended values).

In the case of the corrugated board W according to FIG. 2, at least one shield means 4 is provided in the interior of the corrugated board structure. This shield means consists of applied, interconnected, thicker layer components 80 delimiting interspaces 90, which are covered by thinner layer components 90'. The application of said shield means 4 is effected such that the thinner layer components 90' are applied by full-area printing in one printing process, or two printing processes at the most, of the surface of layer 2, prior to the application of the interconnected layer components 80 by printing, or that the interconnected layer components 80 are first applied by printing, whereupon the thinner layer components 90 are formed by subsequent full-area printing. It is also imaginable to carry out one printing process in which the thinner layer components 90 are applied by full-area printing prior to as well as subsequent to the printing processes for producing the interconnected layer components 80 (e.g. three to four printing processes). In the thinner layer components 90' it will be expedient to adjust the application thickness such that said thinner layer components 90' can be penetrated by the adhesive for glueing the layers 1,2.

In the corrugated board structure according to FIG. 2, the shield means 4 may just as well be applied to one or to both surfaces of a corrugated layer 1, or to the surface 40 of one of the layers 3 or of both layers 3.

Preferably, but not necessarily, one of the two surfaces 30 of the layers 3 has applied thereto a continuous conducting coating 5, 6 consisting of a conducting material. Below said coating 5, 6, or on top of, or within said coating 5, 6, a sublimable corrosion inhibitor 12 (indicated by a broken line) can be provided. In the case of the embodiment shown in FIG. 2, a shield means 4 is applied to each of the surfaces 40 and 40' of the central layer 2.

In the case of the open corrugated board W according to FIG. 3, the shield means 4, which consists of interconnected layer components 80 and of intermediate interspaces 90, is provided between the layers 2 and 1. On the outer surface, a conducting coating 5 is indicated. This conducting coating may, alternatively or additively, also be provided on the free outer surface of the corrugated layer 1.

The shield means 4 according to FIG. 2, which comprises the interconnected layer components 80 and the thinner layer components 90' filling the interspaces 90, could just as well be provided in the case of the corrugated boards according to FIG. 1 or FIG. 3. Vice versa, the shield means 4 of FIG. 1 comprising the free interspaces 90 may also be provided in the corrugated board W according to FIG. 2.

In the case of each of the embodiments shown, the shield means 4 may just as well be inserted with a web of material, which comprises the interconnected layer components 80 as well as the interspaces 90 and the thinner layer components 90', respectively, if necessary with the aid of a carrier web (plastics sheet, paper or textile).

The total area occupied by the interspaces 90 and the thinner layer components 90' is larger than the total area occupied by the interconnected layer components 80. The conducting coating 5, 6 is applied to the respective surface with a weight of approx. 25 to 30 $g/m^2$ (wet). If a corrosion inhibitor 12 is provided, said corrosion inhibitor will be admixed e.g. to the conducting lacquer for the conducting coating 5, 6 in an amount of 5 to 10% by weight.

Figure 4:
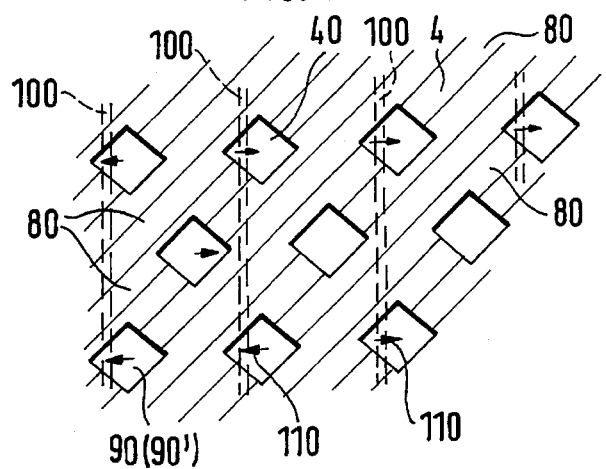
FIG. 4 shows a top view in the line of sight II—II of FIG. 1, FIG. 5a–5e show detail variations

FIG. 4 is a schematic top view in the line of sight II—II of FIG. 1 and corresponds to a view of the shield means 4 in FIG. 2 or in FIG. 3. The interspaces 90 and the thinner layer components 90' occupy a certain area and they are distributed comparatively uniformly such that they define a pattern. The interspaces 90 and the thinner layer components 90', respectively, are constructed and arranged in such a way that the wave crests 100 of the corrugated layer 1 are, at least in certain areas in the interspaces, either in directed contact with the surface 40, or arranged in close, opposite relationship therewith. The adhesive, which is not shown, establishes a firmly adhering connection between the layers 1, 3 or 1, 2. The glueing points are indicated by arrows 110 in FIG. 4. It will be expedient when the pattern of the interspaces 90 and of the thinner layer components 90' is oriented obliquely or perpendicularly to the orientation of the wave crests 100 so as to obtain the maximum number of uniformly distributed points of intersection between the wave crests 100 and the interspaces 90 and the thinner layer components 90', respectively at which glueing can be effected.

The interspaces 90 and the thinner layer components 90' occupying a certain area can have any desired shape. It will be expedient, when they are round, quadrangular or rhombic, as indicated in FIG. 4 and 5.

Figure 5A:
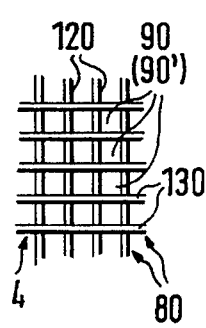

According to FIG. 5a, the shield means 4 consists of lines, rods, paths, or strips 120 and 130, which are applied such that a network or latticework is defined and which cross one another at right angles or at any other desired angle, said lines, paths, rods or strips defining the interconnected layer components 80. In the interspaces 90, the surface of the layer to which the shield means 4 is applied is either exposed, or the thinner layer components 90' are provided, which improve the shielding effect of the interconnected layer components 80.

Figure 5B:

In FIG. 5b, various geometrical shapes for the interspaces 90 and the thinner layer components 90' which occupy a certain area, are indicated, said geometrical shapes guaranteeing the largest possible number of points of intersection with the wave crests 100 of the corruagted layer 1.

Figure 5C:

The shield means 4 according to FIG. 5c consists of wavy lines 140, which cross one another and which include the interspaces 90 and the thinner layer components 90'.

Figure 5D:
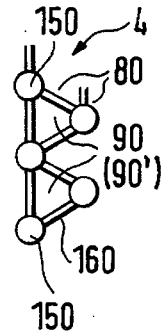

In FIG. 5d, the interconnected layer components 80 are approximately circular areas 150, which are interconnected by cross connections 160 and which delimit the interspaces 90 and the thinner layer components 90'.

Figure 5E:
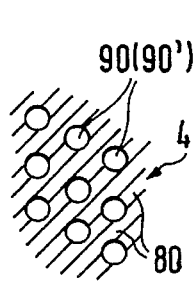

According to FIG. 5e, the interconnected layer components 80 are applied such that separate, approximately circular interspaces 90 or thinner layer components 90' are included in the shield means 4.

If a shield means 4, which is constructed or applied in the manner described hereinbefore, is applied to at least one surface of a layer 1, 2, 3 located in the interior of the corrugated board structure, sufficient shielding will be achieved by means of a comparatively small amount of shielding material and the formation of long-lasting glueing points between the individual layers will be possible.

The respective corrugated board structure has provided therein at least one shield mens 4 with interconnected layer components 80. If a full-area coating 5, 6 of conducting material is additionally provided, said coating will be applied to at least one exterior surface.

If desired, a sublimable corrosion inhibitor 12 is provided on, in, or below the conducting coating.

A folding case F consisting of a corrugated board W according to FIG. 6 is a squared box comprising a bottom part 7 and a cover 8, which is adapted to be put over the opening of said bottom part 7. The interior, which is identified by reference numeral 9, serves to accommodate and protect at least one electronic component, e.g. the article 10. The surfaces of the folding case facing the interior 9 and, if necessary, also the outer surfaces of the folding case have been treated with a conducting coating 5, 6. Furthermore, a printed image 11 can be provided on top of, or below the coating 5, 6. If only one outer side of the corrugated board W in the folding case F is provided with a conducting coating, said coating should be applied to the outer surface of the folding case F. If only one shield means 4 is included in the corrugated board structure, said shield means should be positioned on the side of the corrugated layer 1 facing away from the interior 9 because of the risk of punctures from inside.

FIG. 7 shows a sheet material B which consists of the corrugated board W according to one of the FIGS. 1 to 3 and which can be used for packing one or several articles 10, or for producing blanks for folding cases F. The article 10 is wrapped into the sheet material B, both outer surfaces of said sheet material B being provided with a conducting coating 5, 6 in an expedient manner. If desired, a printed image 11 is applied as well, or the sheet material B bears an imprint on one side or on both sides thereof.

The invention claimed is:

1. A corrugated board used for folding cases or for sheet materials for protecting electrostatically endangered articles against electrostatic discharges and electric fields, comprising a corrugated layer, a flat layer on one side of said corrugated core layer, a shielding layer (4) positioned between said corrugated core layer and said flat layer, said shielding layer having shielding material is selected from the group consisting of carbon, graphite and mixtures thereof, said shielding layer having a plurality of interspaces (90), and said corrugated layer is bonded or glued to said flat layer at at least some of said interspaces.

2. The corrugated board according to claim 1, wherein the interspaces are formed by interspace indentations (90') which are thinner than adjacent surrounding surfaces (80).

3. The corrugated board according to claim 2, wherein the thickness and the density of said interspace indentations (90') is adjusted such that said interspace indentations (90') are permeable to the glue or adhesive used to glue the corrugated layer to said flat layer.

4. The corrugated board according to claim 1 wherein the interspaces (90), are open to expose said flat layer.

5. A corrugated board according to claim 4 wherein the interspaces are separated from each other and define an approximately regular pattern.

6. The corrugated board according to claim 5 wherein a total area occupied by the interspaces (90) exceeds an area not occupied by the interspaces (90).

7. The corrugated board according to claim 4, wherein the interspaces (90) define an approximately regular pattern whose orientation is perpendicular to or oblique to the direction of wave crests (100) of said corrugated layer.

8. The corrugated board according to claim 4 wherein there are first and second corrugated layers, two shielding layers positioned between said first and second corrugated layers, an intermediate flat layer positioned between said two shielding layers, and a second flat layer on an outer surface of said first corrugated layer and a third flat layer on an outer surface of said second corrugated layer.

9. The corrugated board according to claim 4 wherein, a full area conductive coating material is provided on at least one exterior surface of the corrugated board.

10. The corrugated board according to claim 9 wherein a sublimable corrosion inhibitor is provided on, in, or below the conducting coating material.

11. The corrugated board according to claim 8 wherein a full area conductive coating material is provided on an exterior surface of said second flat layer.

12. The corrugated board according to claim 11 wherein a sublimable corrosion inhibitor is provided on, in, or below the conducting coating material.

13. A corrugated board according to claim 3 wherein the interspaces are separated from each other and define an approximately regular pattern.

14. The corrugated board according to claim 13 wherein a total area occupied by the interspaces (90) exceeds an area not occupied by the interspaces (90).

15. The corrugated board according to claim 3, wherein the interspaces (90) define an approximately regular pattern whose orientation is perpendicular to or oblique to the direction of wave crests (100) of the corrugated layer.

16. The corrugated board according to claim 3 wherein there is a first corrugated layer, a second corrugated layer, two shielding layers positioned between said first and second corrugated layers, an intermediate flat layer positioned between said two shielding layers, and a second flat layer on an outer surface of said first corrugated layer and a third flat layer on an outer surface of said second corrugated layer.

17. The corrugated board according to claim 3 wherein, a full area conductive coating material is provided on at least one exterior surface of the corrugated board.

18. The corrugated board according to claim 17 wherein a sublimable corrosion inhibitor is provided on, in, or below the conductive coating material.

19. The corrugated board according to claim 16 wherein a full area conductive coating material is provided on an exterior surface of said second flat layer.

20. The corrugated board according to claim 19 wherein a sublimable corrosion inhibitor is provided on, in, or below the conductive coating material.

21. The corrugated board of claim 4 wherein the shielding layer is formed by printing the shielding layer on an inner surface of the flat layer with said inner surface facing said corrugated layer.

22. The corrugated board of claim 3 wherein the shielding layer is formed by priming the shielding layer on an inner surface of the flat layer with said inner surface facing said corrugated layer.

23. The corrugated board of claim 3 wherein the indentations are applied by full-area printing, spraying or by spread coating on an inner surface of said flat layer with said inner surface facing said corrugated board.

24. A method of producing a corrugated board consisting of paperboard or paper material and used for cases or for sheet materials for protecting electrostatically endangered articles against electrostatic discharges and electric fields, comprising providing at least one corrugated layer;

applying a shielding layer to at least one surface of a flat layer, said shielding layer having shielding material selected from the group consisting of carbon, graphite and mixtures thereof;

applying said shielding layer to said flat layer to provide a said shielding layer with a plurality of intermediate interspaces (90), and gluing the flat layer to said corrugated layer at at least some of said interspaces.

25. The method according to claim 24 comprising applying said shielding layer such that said interspaces are open and expose said flat layer.

26. The method according to claim 24, comprising applying to said flat surface said shielding layer with said plurality of intermediate interspaces (90') being thinner than the shielding material surrounding said intermediate interspaces, gluing said corrugated layer to said flat layer through said intermediate interspaces (90').

27. The method according to claim 25 wherein the shielding layer component is printed on in several printing processes and that it is compacted by said printing processes.

28. The method according to claim 26 wherein the shielding layer and the shielding layer interspaces (90') are printed on in several printing processes and that they are compacted by said priming processes.

29. The method according to claim 26 comprising applying the thinner intermediate interspaces to said flat layer by full-area printing, spraying or by spread coating.

30. The method according to claim 25 comprising attaching a first flat layer to one face of said corrugated layer, applying said shielding layer to a second flat layer, attaching said second flat layer to the other face of said corrugated layer with said shielding layer facing said corrugated layer and full-area coating an outer surface of said second layer with a conductive coating.

31. The method according to claim 26 comprising attaching a first flat layer to one face of said corrugated layer, applying said shielding layer to a second flat layer, attaching said second flat layer to the other face of said corrugated layer with said shielding layer facing said corrugated layer and full-area coating an outer surface of said second layer with a conductive coating.

* * * * *

UNITED STATES PATENT AND TRADEMARK OFFICE
CERTIFICATE OF CORRECTION

PATENT NO. : 5,486,405
DATED : January 23, 1996
INVENTOR(S) : Wolf-Henning Laves

It is certified that error appears in the above-indentified patent and that said Letters Patent is hereby corrected as shown below:

Column 9, line 15, delete "priming" and insert --printing--.

Column 10, line 17, delete "priming" and insert --printing--.

Signed and Sealed this

Thirteenth Day of August, 1996

*Attest:*

BRUCE LEHMAN

*Attesting Officer*     Commissioner of Patents and Trademarks